United States Patent [19]
Clatanoff et al.

[11] Patent Number: 5,864,367
[45] Date of Patent: Jan. 26, 1999

[54] VIDEO PROCESSING SYSTEM WITH SCAN-LINE VIDEO PROCESSOR

[75] Inventors: Todd A. Clatanoff, Allen; Vishal Markandey, Dallas; Kazuhiro Ohara, Plano, all of Tex.

[73] Assignee: Texas Instruments Incorporated, Dallas, Tex.

[21] Appl. No.: 701,902

[22] Filed: Aug. 23, 1996

[51] Int. Cl.⁶ ..................................................... H04N 7/01
[52] U.S. Cl. ........................... 348/441; 348/452; 348/581
[58] Field of Search ...................... 348/441, 448, 348/445, 453, 452, 451, 458, 578, 581, 571, 699–701

[56] References Cited

U.S. PATENT DOCUMENTS

| | | | |
|---|---|---|---|
| 4,967,271 | 10/1990 | Campbell et al. | 348/450 |
| 5,355,328 | 10/1994 | Arbeiter et al. | 348/445 |
| 5,369,443 | 11/1994 | Woodham | 348/578 |
| 5,428,398 | 6/1995 | Faroudja | 348/451 |
| 5,488,421 | 1/1996 | Hwang et al. | 348/448 |
| 5,488,422 | 1/1996 | Faroudja et al. | 348/448 |

OTHER PUBLICATIONS

Markandey, Vishal, et al., "Motion Adaptive DeInterlacer for DMD (Digital Micromirror Device) Based Digital Television", *IEEE 1994*, pp. 735–741.

Yugami, Masafumi, "EDTV with Scan–Line Video Processor", *IEEE 1992*, pp. 553–562.

*Primary Examiner*—Victor R. Kostak
*Attorney, Agent, or Firm*—Julie L. Reed; Richard L. Donaldson

[57] ABSTRACT

An improved processing system (10) for video signal processing. The system uses only one newer version scan-line video processor (12) at nearly maximum efficiency, with a digital input that is at a common rate. The processor performs motion detection, motion adaptive scan conversion, horizontal and vertical scaling and applies sharpness control within a limited amount of instruction space, and applies these functions to four different video formats.

10 Claims, 5 Drawing Sheets

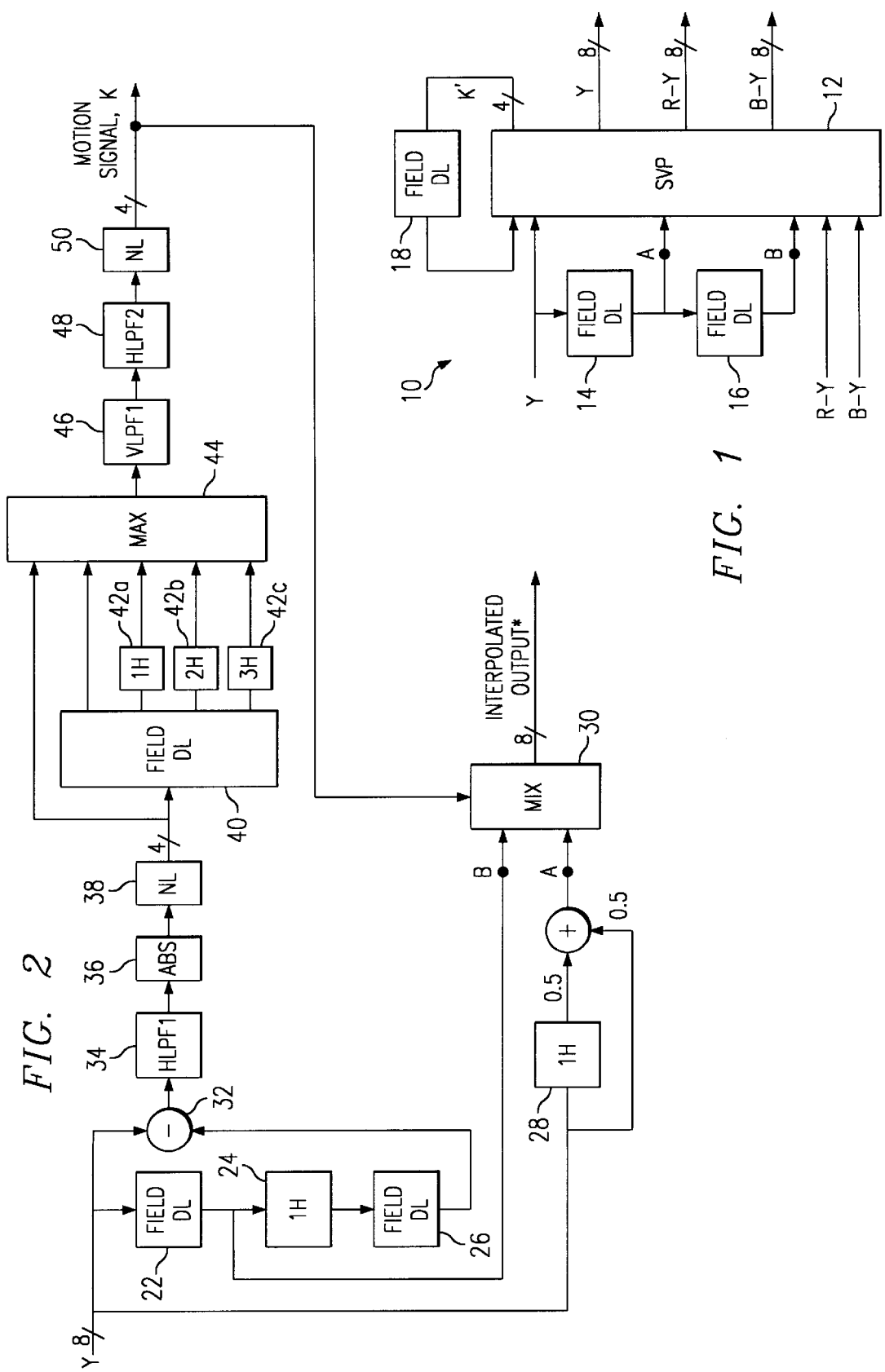

VIDEO PROCESSING SYSTEM WITH SCAN-LINE VIDEO PROCESSOR

BACKGROUND OF THE INVENTION

Related Applications

This application is filed concurrently with "Improved Video Processing Using Scan-Line Video Processors", and "Sharpness Control for Digital Displays,".

Field of the Invention

This invention relates to display systems, more particularly to display systems that use digital processing of the video signals.

Background of the Invention

The current majority of display systems involve cathode ray tube (CRT) displays which have scanning guns that "spray" electrons onto the phosphors on the back side of the display screen. Due to the nature of the scanning guns, broadcast video signals are sent in an interlaced format. Each frame of data is divided into two fields, one containing the odd-numbered lines of the frame, the other containing the even-numbered lines.

Certain technologies are moving to the forefront of the display market, however, that cannot use this type of format. One example is spatial light modulators, which normally consist of an array of individually selectable elements over addressing circuitry that is addressed to make the selection. The addressing circuitry of these modulators is typically organized in rows and columns, making the selection of all of the odd-numbered lines or the even-numbered lines awkward, slow and costly.

Methods have been developed to alter the format of this data to a progressively scanned format, where the entire frame of data is formed. Often times this formation occurs by interpolating the missing field using previous fields to estimate the pixel values of the missing fields. This interpolation process can be expensive and computationally demanding, driving up the system performance requirements and the cost.

Another adaptation that must be made is the ability of the system to display different formats of incoming data. Typically, in CRT systems the incoming format remained an analog input and the guns just adjusted to the new dimensions. With the individual elements in the arrays, there is sometimes a one-to-one correspondence between the pixels on the image and the elements. For example, a system with 640 pixels per line and 480 lines would require a device that had 640 elements per line and 480 lines of elements, not including any scaling possibilities.

The incoming data is typically digitized at a rate equal to the pixels per line dimension in these types of systems. The 640 pixels per line would be digitized at 640 samples per line. The processor, therefore, must be able to adjust not only for displaying more than one format on a fixed number of elements in the array, but to have a sampling rate that is compatible with any given format.

One new advance in the video processing area is the scan-line video processor. These processors have several advantages that allow the solutions to the above problems. However, the first versions of these processors had an extremely limited instruction space, requiring the use of several processors in a display system. The newer versions of these processors have more instruction space, and are priced competitively when compared with the previous version.

Therefore, a system using the newer versions of scan-line video processors is needed that uses the fewest possible processors while still allowing the full functionality mentioned above.

SUMMARY OF THE INVENTION

One aspect of the invention is a processing system for video data. The system receives data and formats or samples it at a common rate. This allows the system to format and process the data for different input formats. The system relies upon only one processor to perform functions of motion detection, motion adaptive scan conversion, horizontal and vertical scaling and sharpness control.

It is an advantage of this system in that it does not require extra processors, making it less expensive than multiple processor systems.

It is a further advantage of this system in that it is capable of handling new formats such as PALplus in addition to other formats.

It is a further advantage of this system in that it allows the use of complex FIR filters while not overrunning the available instruction space.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 1 shows a block diagram of a system architecture for video processing which only requires one scan-line video processor.

FIG. 2 shows an example of a motion adaptive scan rate conversion process which can be used in a processing system for video data.

DETAILED DESCRIPTION OF THE PREFERRED EMBODIMENTS

Figure 3A:
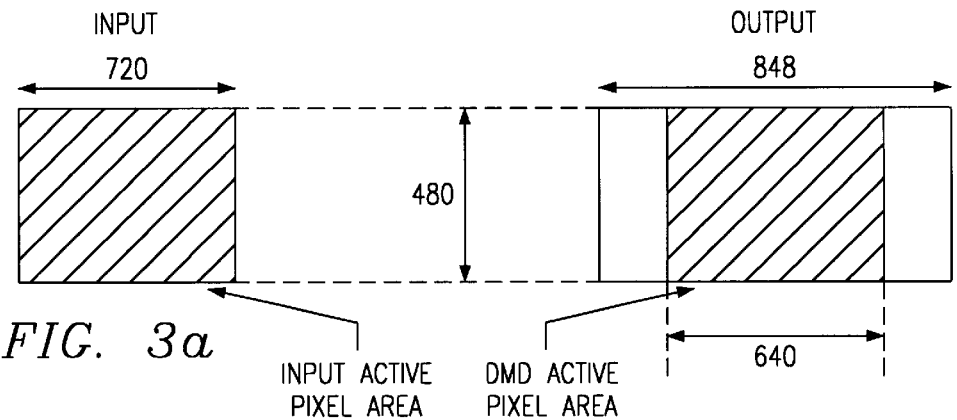
FIGS. 3a–3d show variants on the format of an incoming video signal.

FIG. 1 shows an overall system architecture 10 for video processing using only one scan-line video processor (SVP) 12. The incoming luminance signal Y undergoes two field delays at field DLs 14 and 16. These field delays are used to allow access to data from the most previous and next most previous fields. For example, if the incoming field at Y were said to be field 2, after field DL 14, at point A, the field would be the most previous field, field 1. After field DL 16, at point B, the field would be the next most previous field, field 0. Field 2 and field 0 have the same numbered lines in them, but are from different video frames. This additional data will be used in the interpolation of data as will be discussed with reference to FIG. 2.

It must be noted that the input signal Y is typically already in digital form when it reaches the processor 12. This could result from digitization of an analog signal, as would happen with current broadcast video signals. Additionally, the signal could originate as a digital signal. The system of FIG. 1 will need to be able to use the data of any format on the spatial light modulator or modulators that form the images for display.

Figure 5:
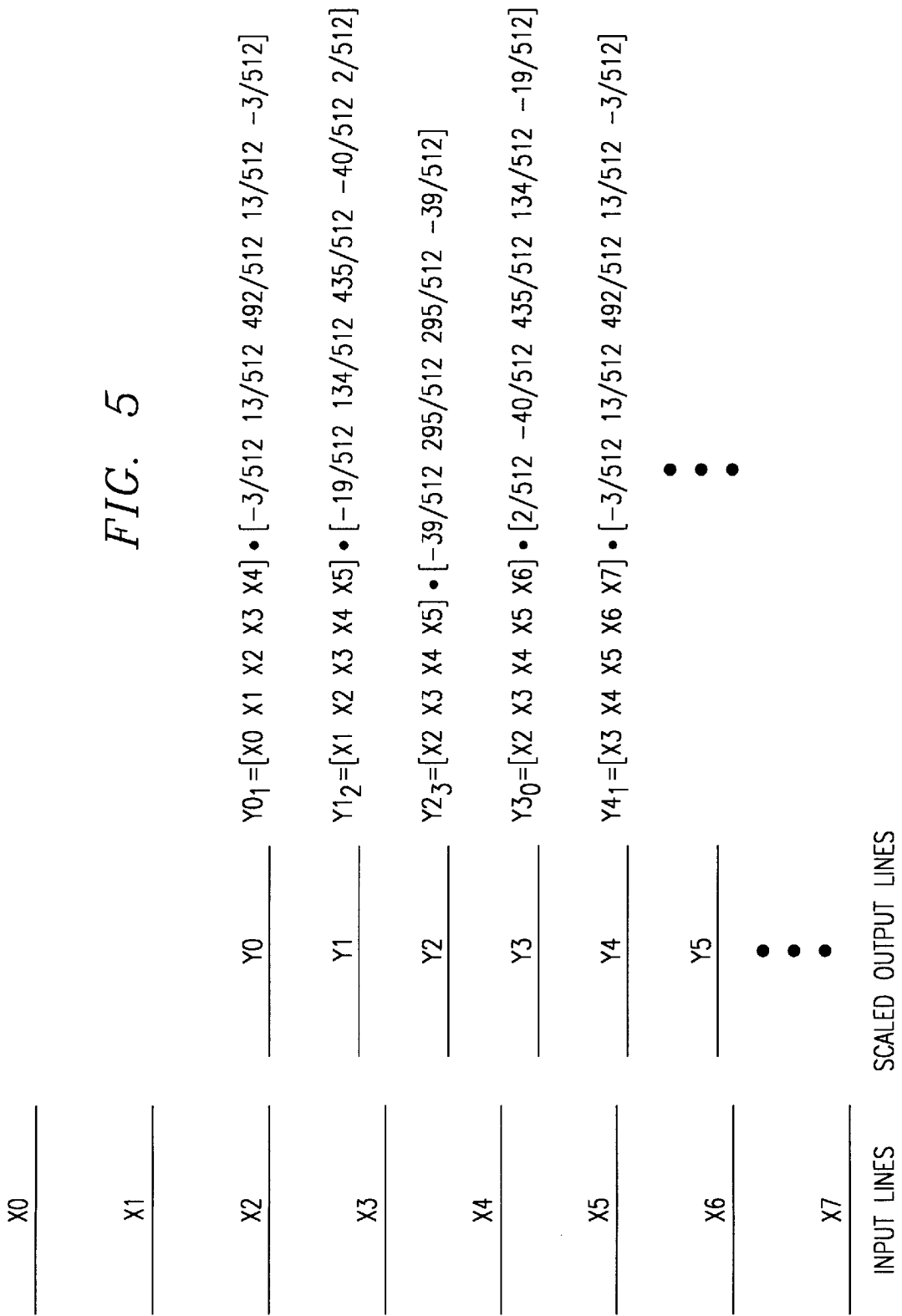
FIG. 5 shows a graphical representation of one type of vertical scaling that may be used in a processing system for video data.
Figure 6:
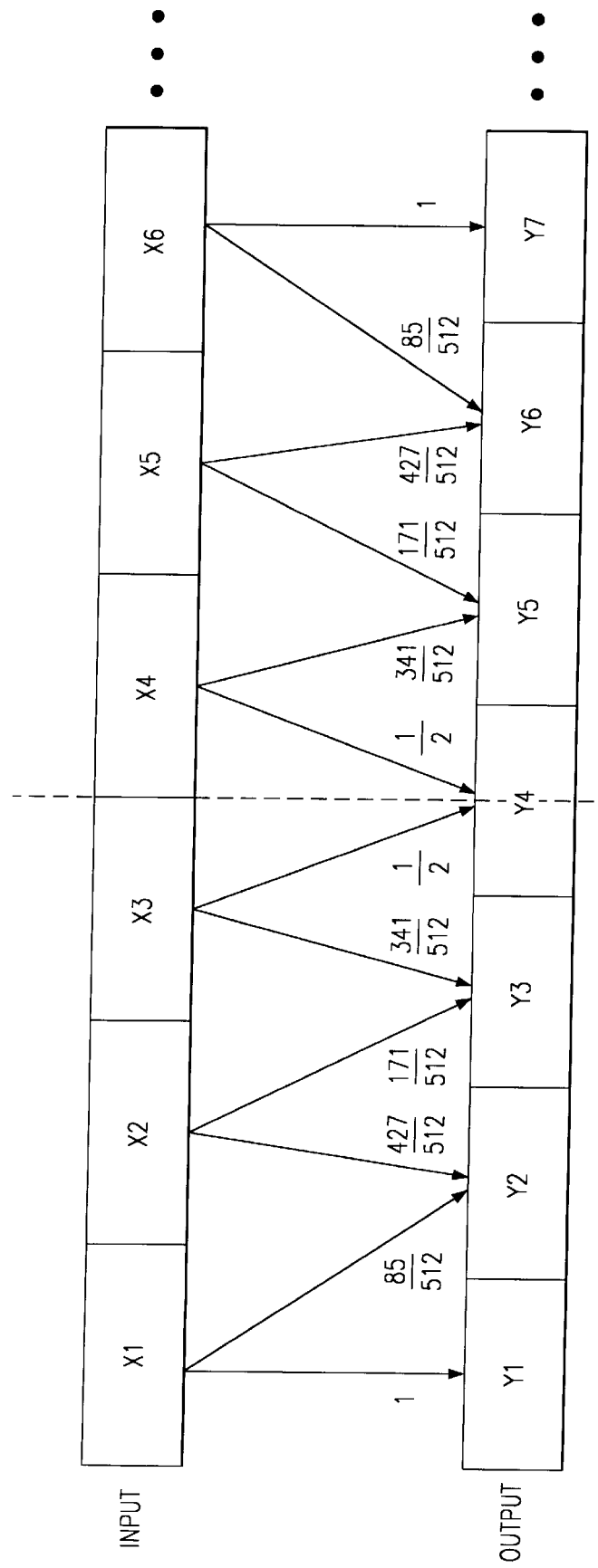
FIG. 6 shows a graphical representation of one type of horizontal scaling that may be used in a processing system for video data.

Therefore, if the data is digitized from an analog input, it must be sampled at a common rate. If the data is already digital, it must be converted to a common rate or samples per line. This will be addressed with reference to FIGS. 3 and 4. FIGS. 5 and 6 will discuss specific techniques for scaling the common rate signal to fit multiple formats. All of these functions may be performed by scan line video processor. It is an advantage of this invention in that it allows all of these functions to be performed by the same processor, thereby reducing the amount of hardware and the system cost.

FIG. 2 shows one possible process for motion adaptive progressive scan conversion. This process is used to interpolate the "missing field" from an interlace data field, while accounting for motion signals between the fields. The mixing circuit 30 uses data from the following lines of data, where field 3 is the incoming field: the most previous field, field 2, from the field DL 22; the adjacent line in the next most previous field, field 1, from horizontal DL 24 and field DL 26; and the motion signal k, from the top data path. The top data path initially uses a comparison between the incoming signal Y, field 3, and the adjacent line from field 1, which has like-numbered lines. An arithmetic or other circuit finds the difference between these at 32.

The resulting difference is passed through a horizontal lowpass filter HLPF1 at 34, and the absolute value is found at ABS 36. A non-linear function NL 38 is applied. The nonlinear function performs thresholding to eliminate small difference signal values due to noise. It also reduces the resolution of the difference signal to 4 bits. A comparator 44 determines the maximum of several values: data from field 0, out of field DL 40; data from the adjacent lines to the line undergoing processing, out of horizontal delays 42a, 42b, and 42c; and the resulting 4-bit signal from the nonlinear function 32.

This maximum value is then filtered both vertically and horizontally at VLPF1 46 and HLPF2 48, respectively. The nonlinear function 50 is similar to that of 38 in that it reduces signal noise. The resulting motion signal, k, is then passed to the mixing circuit 30 and used to determine the interpolated output.

After this motion adaptive scan conversion is performed, the data will typically have to be scaled to fit the dimensions of the spatial light modulator used to form the image for display. This will be discussed with reference to FIGS. 3a–3d and 4a–4d. FIGS. 3a–3d show graphical representation of four different formats. FIG. 3a shows a graphical representation of the scaling and processing necessary for NTSC input.

As can be seen in FIG. 3a, the input active pixel area is 720 samples wide and 480 lines long. The rate of 720 samples per line is an example of the common rate discussed earlier. It must be sampled down from 720 to 640 samples per line in order to maintain a 4:3 square pixel aspect ratio. However, the selection of 720 samples makes this an "integer" scaling process of 9:8, rather than any kind of fractional scaling process. This conversion does not require any vertical scaling.

With regard to the display on the device, the left side of FIG. 3a shows that device used in this example has a dimension of 848×480. This allows display of the NTSC standard of 640×480.

Figure 4A:
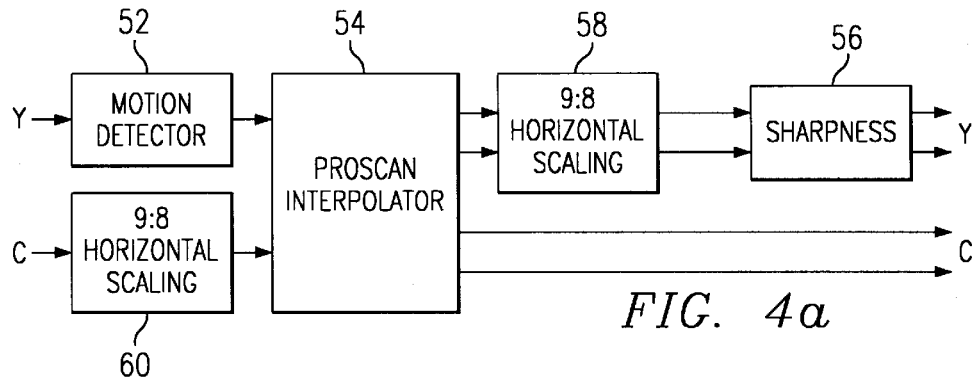
FIG. 4a–4d show block diagram views of the processing functions that must be performed on a variety of formats of an incoming video signal.

FIG. 4a shows the process flow for NTSC signals in block diagram form. The process blocks of proscan interpolation 54, motion detection 52, and sharpness control 56 remain the same in each embodiment shown in FIG. 4. The luminance signal, Y, undergoes motion detection 52 before proscan interpolation 56, then is scaled horizontally at 58 and finally sharpened at 56. The chrominance signal, C, undergoes horizontal scaling first at 60, the proscan interpolation at 54.

Figure 3B:
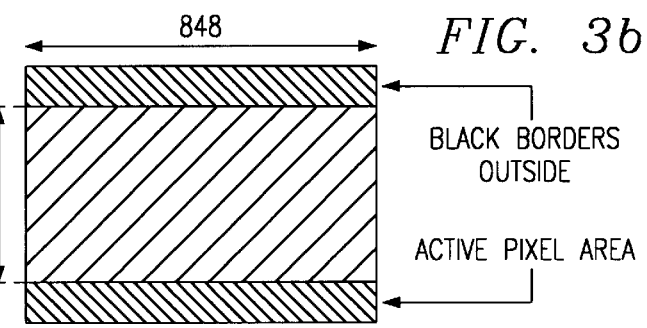

FIG. 3b shows a similar conversion for a format referred to as NTSC Letterbox. The input pixel active area is still 720 samples wide, but has a reduced length of 360 lines, instead of the standard 480. The other 120 lines are black borders, of 60 lines per side. This type of format can be converted to 848×480 by doing both vertical and horizontal scaling. This format has a 16:9 aspect ratio, which will require the image be scaled horizontally from 720 samples to 848 elements, and vertically from 360 lines to 480 lines of elements. The scaling factors are 5:6 horizontally (720/848), and 3:4 vertically (360/480). The horizontal black borders seen in the input are cropped from the final image.

Figure 4B:
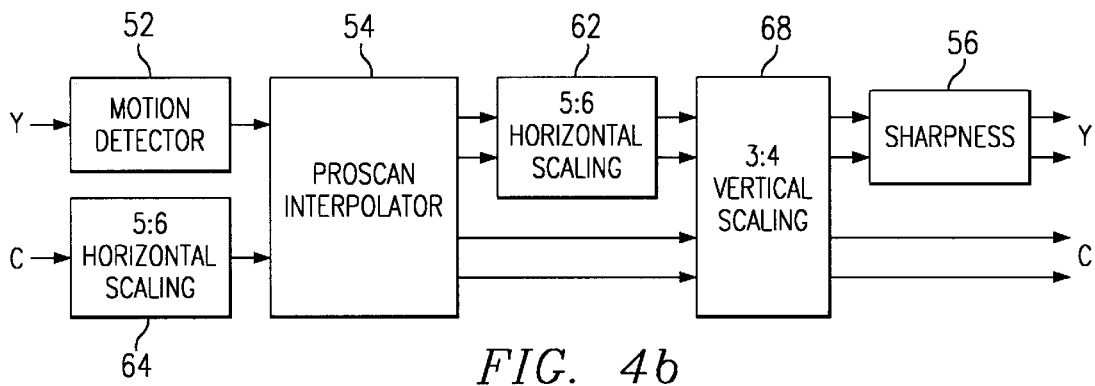

FIG. 4b shows the processing functions for NTSC Letterbox. The luminance signal again undergoes motion detection 52, proscan interpolation 54, and 5:6 horizontal scaling at 62. The chrominance signal undergoes 5:6 horizontal scaling at 64, proscan conversion at 54, and then is used in conjunction with the luminance signal at the vertical scaling process 68. Finally, the luminance signal is sharpened at 56.

Figure 3C:
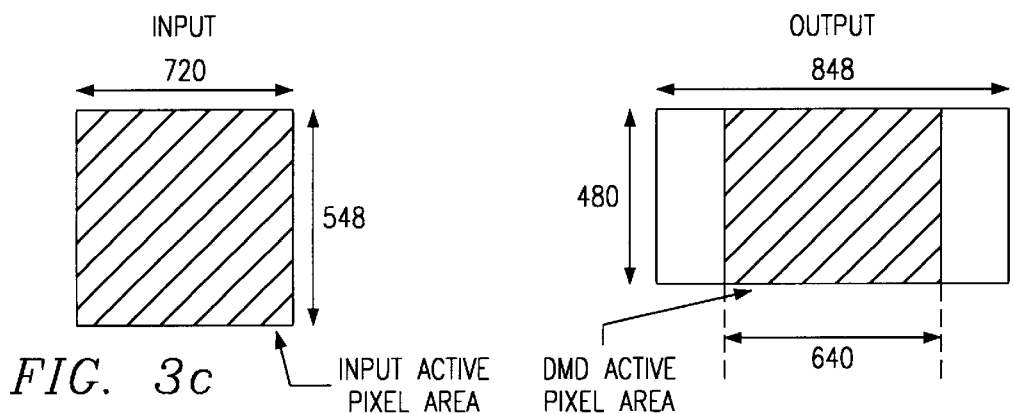
Figure 4C:
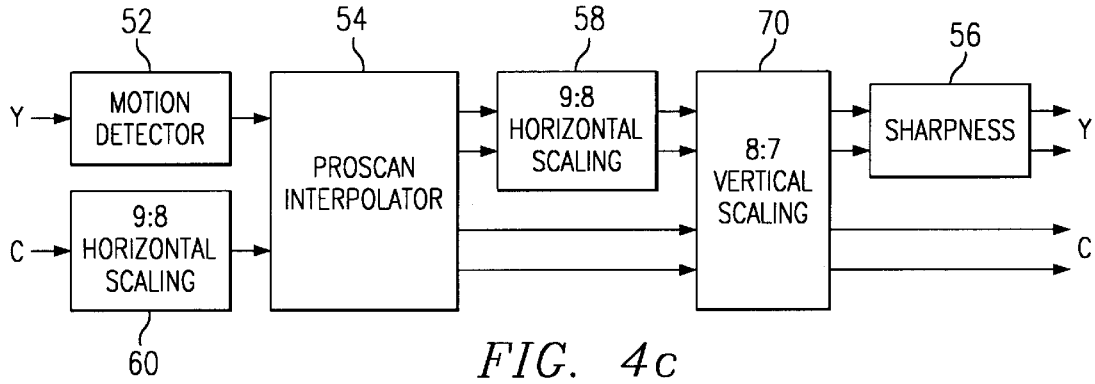
Figure 4D:
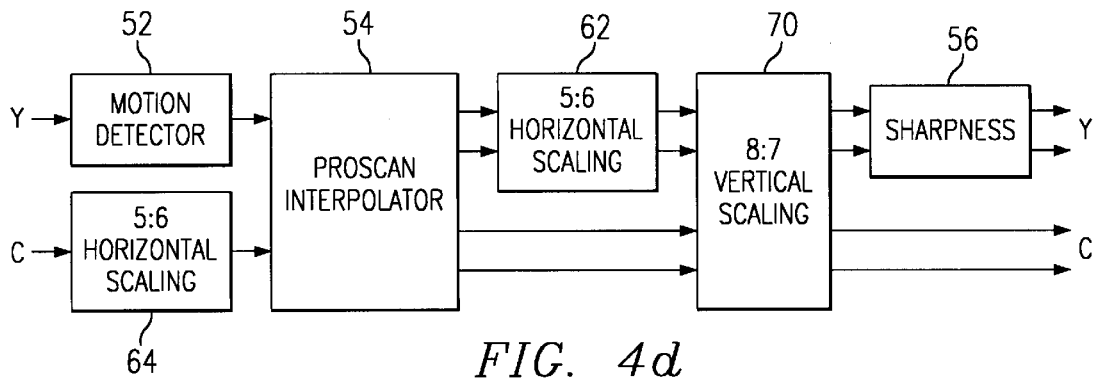

The same type of processing can be used with PAL format signals. As shown in FIG. 3c, the incoming data has a dimension of 720×576. However, for this display application only 548 out of 576 lines are used. It will be scaled horizontally down by a factor 9:8 and scaled down vertically by 8:7. The block diagram of the processes is shown in FIG. 4c. The same processes are in place, with the addition of 8:7 vertical scaling of both chrominance and luminance at 70.

Figure 3D:
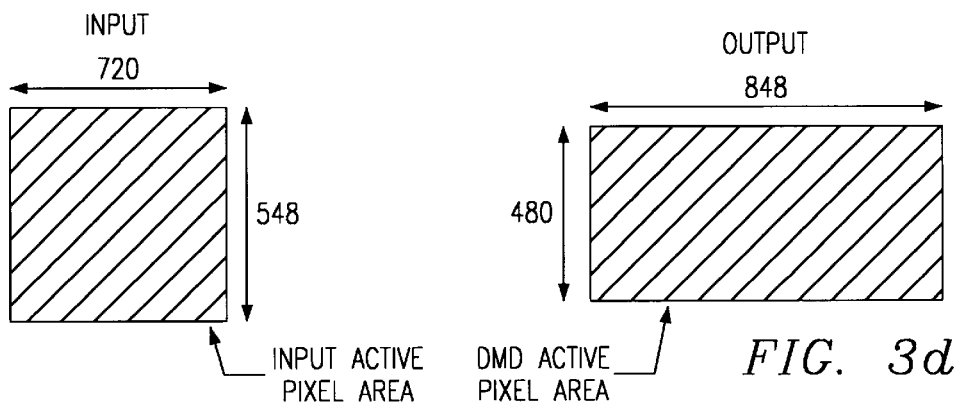

A relatively new development in PAL format is PALplus. PALplus is similar to NTSC Letterbox in that contains video information for a 16:9 aspect ratio. However, the information required to produce a 16:9 picture has been horizontally squeezed to fit within a 4:3 aspect ratio. As can be seen in FIG. 3d, the image will have to be scaled horizontally and vertically, and some of the columns will have to be cropped. Horizontally, the data must be scaled by a factor of 5:6, to get from 720 to 864. Sixteen columns will then have to be cropped to fit the device's 848 columns. Vertically the 548 rows will have to be scaled by a factor of 8:7 to shrink it to 480 rows. The processing blocks for this process is shown for chrominance and luminance signals in FIG. 4d.

The filters used for scaling can become extremely complex and require many hundreds of instructions. However, because of this order of processing and the care taking in planning the instruction sequence, newer versions of the SVP allow up to 2730 instructions by using 43 MHz for the processor clock. This allows the use of very sophisticated and precise filters for scaling, as shown in FIG. 5.

Shown is an example for discussion purposes of the vertical scaling coefficients for 3:4 scaling. In the 3:4 scaling process, three lines are used to create 4. For example, lines $X_2$, $X_3$, and $X_4$ are used to create Y0, Y1, Y2, and Y3. The output lines Y0–Y4 are found by applying the dot product of the coefficients shown with the lines of input data X0–X7. For example, [A B]•[X Y]=AX+BY. The subscript numbers designate from which sub-filter the coefficients were produced. For example, $Y0_1$ has coefficients −3/512, 13/512, 492/512, 13/512, and −3/512. These were produced from sub-filter 1. The filters are applied in the order 1, 2, 3, 0, 1 . . . etc. Note also that at Y4, the coefficients begin to repeat as the sub-filter used is repeated.

The filters used here are finite impulse response (FIR) filters, which are optimized for the trade off between picture quality and the cost of implementation.

Finally, the sole processor of the system must also be able to perform horizontal scaling as discussed previously. A graphical representation of such a process is shown in FIG. 6. The input samples are combined to produce the output samples as follows:

| | | |
|---|---|---|
| $Y1 = X1$ | $Y2 = 85/512\ X1 + 427/512\ X2$ | $Y3 = 171/512\ X2 + 341/512\ X3$ |
| $Y4 = 1/2\ X3 + 1/2\ X4$ | | $Y5 = 341/512\ X4 + 171/512\ X5$ |
| $Y6 = 427/512\ X5 + 85/512\ X6$ | | $Y7 = X6.$ |

This system uses 2608 instructions to perform all of the above functions, which is approximately 95% of the available 2730 instruction space. The advanced FIR filters were not previously usable in the older SVPs because of the amount of instruction space they consumed. Typically, scaling involves using as many scaling factors as possible, here the scaling factors have been limited without sacrificing any functionality of the system.

Finally, this system has the capability of being adaptable to new and different formats. PALplus, which has not been previously considered was used easily in this system. This is due to the inherent flexibility of the system.

Thus, although there has been described to this point particular embodiments of an improved scan-line processor-based video system, it is not intended that such specific references be considered as limitations upon the scope of this invention except in-so-far as set forth in the following claims.

What is claimed is:

1. An improved video processing system, comprising:
   a digital input sampled at a common rate;
   a single scan-line video processor operable to perform all operations, said operations including receiveing said digital input at said common rate, performing motion detection, motion adaptive proscan interpolation, and horizontal and vertical scaling, thereby producing processed data, and said processor appliing sharpness control to said processed data.

2. The system of claim 1 wherein said common rate is 720 samples per line of video input.

3. The system of claim 1 wherein said vertical scaling is accomplished with the use of finite impulse response filters.

4. The system of claim 1 wherein said horizontal scaling is accomplished with the use of finite impulse response filters.

5. The system of claim 1 wherein said system is capable of receiving and displaying several broadcast video formats.

6. The system of claim 1 wherein said digital input is NTSC.

7. The system of claim 1 wherein said digital input is NTSC Letterbox.

8. The system of claim 1 wherein said digital input is PAL.

9. The system of claim 1 wherein said digital input is PALplus.

10. The system of claim 1 wherein both said horizontal and said vertical scaling are applied using finite impulse response filters.

* * * * *